United States Patent
Lu et al.

(10) Patent No.: US 12,474,520 B2
(45) Date of Patent: Nov. 18, 2025

(54) ILLUMINATED KEYBOARD AND BACKLIGHT MODULE THEREOF

(71) Applicant: CHICONY ELECTRONICS CO., LTD., New Taipei (TW)

(72) Inventors: Chih-Yi Lu, New Taipei (TW); Chih-Hung Lin, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/413,655

(22) Filed: Jan. 16, 2024

(65) Prior Publication Data

US 2024/0329292 A1    Oct. 3, 2024

(30) Foreign Application Priority Data

Mar. 27, 2023   (TW) .................................. 112111572

(51) Int. Cl.
*F21V 8/00* (2006.01)
(52) U.S. Cl.
CPC ......... *G02B 6/0066* (2013.01); *G02B 6/0021* (2013.01)
(58) Field of Classification Search
CPC .... G02B 6/0031; G02B 6/0088; G02B 6/005; G02B 6/0055; H01H 13/023; H01H 2219/044; H01H 2219/062; H01H 2219/06
See application file for complete search history.

(56) References Cited

U.S. PATENT DOCUMENTS

| | | | |
|---|---|---|---|
| 11,221,515 B1 * | 1/2022 | Wu | G02B 6/0073 |
| 2012/0092271 A1 * | 4/2012 | Liu | G06F 3/04886 |
| | | | 345/173 |
| 2012/0147584 A1 * | 6/2012 | Wu | G06F 3/0202 |
| | | | 362/23.16 |
| 2013/0049995 A1 * | 2/2013 | Wu | H01H 13/83 |
| | | | 341/22 |

(Continued)

FOREIGN PATENT DOCUMENTS

| | | | | |
|---|---|---|---|---|
| CN | 207458813 U | * | 6/2018 | |
| CN | 108493027 B | * | 2/2020 | H01H 13/83 |

(Continued)

*Primary Examiner* — Fatima N Farokhrooz
(74) *Attorney, Agent, or Firm* — MUNCY, GEISSLER, OLDS & LOWE, P.C.

(57) ABSTRACT

An illuminated keyboard includes a backlight module including a light guide plate, and multiple first and second light emitting modules. The light guide plate includes first and second sides opposite to each other, and multiple first and second accommodating portions. Each first accommodating portion has a first incident surface facing the first side. The second accommodating portions are arranged alternately with the first accommodating portions, and each has a second incident surface facing the second side. The first light emitting modules are respectively disposed at the first accommodating portions. Wavelengths of light emitted by the first light emitting modules are different at an initial time, and are changed at a predetermined interval. The second light emitting modules are respectively disposed at the second accommodating portions. Wavelengths of light emitted by the second light emitting modules are different at the initial time, and are changed at the predetermined interval.

15 Claims, 6 Drawing Sheets

(56) References Cited

U.S. PATENT DOCUMENTS

| | | | |
|---|---|---|---|
| 2014/0367238 A1* | 12/2014 | Chen | H01H 13/83 |
| | | | 200/5 A |
| 2015/0061902 A1* | 3/2015 | Casparian | H03K 17/965 |
| | | | 341/22 |
| 2015/0108903 A1* | 4/2015 | Sun | G06F 1/00 |
| | | | 315/153 |
| 2021/0280379 A1* | 9/2021 | Chen | H01H 9/182 |

FOREIGN PATENT DOCUMENTS

| | | | | | |
|---|---|---|---|---|---|
| CN | 113871238 A | * | 12/2021 | | |
| CN | 215988545 U | * | 3/2022 | | |
| CN | 107463268 B | * | 6/2022 | | G06F 3/0202 |
| JP | H0683510 A | * | 3/1994 | | |
| KR | 200438396 Y1 | * | 2/2008 | | |

\* cited by examiner

FIG. 6

ILLUMINATED KEYBOARD AND BACKLIGHT MODULE THEREOF

CROSS-REFERENCE TO RELATED APPLICATION

This application claims the priority benefit of Taiwan application serial No. 112111572, filed on Mar. 27, 2023. The entirety of the above-mentioned patent application is hereby incorporated by reference herein and made a part of this specification.

BACKGROUND

1. Technical Field

The present disclosure relates to an illuminated keyboard and, more particularly, to a backlight module of an illuminated keyboard.

2. Description of the Related Art

With the rapid development in electronic technologies and information industries, computers, laptop computers, tablet computers and smartphones have become indispensable electronic devices in the daily life and work of modern people. Regarding current habits of use of computers, keyboards are one of the necessary input devices. For portable electronic devices such as laptop computers, tablet computers and smartphones, additional keyboards are often used together.

For reasons regarding ease of use or aesthetic values of keyboards, illuminated keyboards are commercially available. Among these keyboards, gaming keyboards designed especially for E-sports games are more common with light sources that display diversified different color changes. In general, in order for an illuminated keyboard to display diversified different color changes, a light source, for example, a light emitting diode (LED) module, is correspondingly provided for each key structure. That is, each LED module corresponds to one of the key structures so that diversified different color changes can then be achieved. However, such configuration of each LED module corresponding to one of the key structures significantly increases production costs of illuminated keyboards. Therefore, it is imperative to come up with a solution in order to improve the issue above.

SUMMARY

In view of the issue above, it is a primary object of the present disclosure to provide an illuminated keyboard and a backlight module thereof, of which the configuration of a plurality of (first and second) light emitting modules on a light guide plate and the novel design of the (first and second) light emitting modules emitting light in different wavelengths at different timings can solve the issue of significantly increased costs as a result of aiming at achieving diversified color changes of a conventional illuminated keyboard and a backlight module thereof.

To achieve the object above, the present disclosure provides an illuminated keyboard including a base plate, a plurality of key structures and a backlight module. The key structures are connected to the base plate. The backlight module is disposed on the base plate and located below the key structures. The backlight module includes a light guide plate, a plurality of first light emitting modules, and a plurality of second light emitting modules. The light guide plate includes a first side and a second side opposite to each other, a plurality of first accommodating portions and a plurality of second accommodating portions. The first accommodating portions are disposed between the first side and the second side. Each of the first accommodating portions has a first incident surface facing the first side. The second accommodating portions are arranged alternately with the first accommodating portions. Each of the second accommodating portions has a second incident surface facing the second side. The first light emitting modules are respectively disposed at the first accommodating portions. Wavelengths of light emitted by the first light emitting modules are different at an initial time, and are changed at a predetermined interval. The light emitted by the first light emitting modules enters the light guide plate via the first incident surfaces, and forms a plurality of first light blending regions between the first accommodating portions and the first side. The second light emitting modules are respectively disposed at the second accommodating portions. Wavelengths of light emitted by the second light emitting modules are different at the initial time, and are changed at the predetermined interval. The light emitted by the second light emitting modules enters the light guide plate via the second incident surfaces, and forms a plurality of second light blending regions between the second accommodating portions and the second side.

To achieve the object above, the present disclosure further provides a backlight module including a light guide plate, a plurality of first light emitting modules, and a plurality of second light emitting modules. The light guide plate includes a first side and a second side opposite to each other, a plurality of first accommodating portions and a plurality of second accommodating portions. The first accommodating portions are disposed between the first side and the second side. Each of the first accommodating portions has a first incident surface facing the first side. The second accommodating portions are arranged alternately with the first accommodating portions. Each of the second accommodating portions has a second incident surface facing the second side. The first light emitting modules are respectively disposed at the first accommodating portions. Wavelengths of light emitted by the first light emitting modules are different at an initial time, and are changed at a predetermined interval. The light emitted by the first light emitting modules enters the light guide plate via the first incident surfaces, and forms a plurality of first light blending regions between the first accommodating portions and the first side. The second light emitting modules are respectively disposed at the second accommodating portions. Wavelengths of light emitted by the second light emitting modules are different at the initial time, and are changed at the predetermined interval. The light emitted by the second light emitting modules enters the light guide plate via the second incident surfaces, and forms a plurality of second light blending regions between the second accommodating portions and the second side.

According to an embodiment of the present disclosure, the light guide plate further includes a third side and a fourth side opposite to each other. The first light emitting modules and the second light emitting modules are arranged from the third side to the fourth side, and are parallel to the first side and the second side.

According to an embodiment of the present disclosure, the wavelengths of the light emitted by the first light emitting modules at the initial time decrease gradually from the third side toward the fourth side.

According to an embodiment of the present disclosure, the wavelengths of the light emitted by the second light emitting modules at the initial time decrease gradually from the fourth side toward the third side.

According to an embodiment of the present disclosure, the wavelengths of the light emitted by the adjacent first light emitting modules and the adjacent second light emitting modules at a same time are different.

According to an embodiment of the present disclosure, a difference between the wavelengths of the light emitted by two adjacent of the first light emitting modules is within a predetermined wavelength range, and a difference of the wavelengths of the light emitted by two adjacent of the second light emitting modules is within the predetermined wavelength range. The predetermined wavelength range is between 5 nm and 35 nm.

According to an embodiment of the present disclosure, the light guide plate has a central region, and the first accommodating portions and the second accommodating portions are disposed in the central region.

According to an embodiment of the present disclosure, the number of the first light emitting modules is greater than or equal to 12, and the number of the second light emitting modules is greater than or equal to 12.

According to an embodiment of the present disclosure, the number of the first light blending regions is greater than or equal to 3, and the number of the second light blending regions is greater than or equal to 3.

According to an embodiment of the present disclosure, a distance from the first incident surface to the first side is a first length. The light emitted by each of the first light emitting modules forms a first light radiation region between the first accommodating portion and the first side. The first light radiation region forms a first illumination width at the first side, and a ratio of the first illumination width to the first length is greater than 2.

According to an embodiment of the present disclosure, the ratio of the first illumination width to the first length is between 2 and 5.

According to an embodiment of the present disclosure, the first light blending regions are region in which at least two of the first light radiation regions formed by the first light emitting modules overlap.

According to an embodiment of the present disclosure, a region in which four of the first light radiation regions overlap one another is a four-order first light blending region. The first light blending regions include a plurality of four-order first light blending regions.

According to an embodiment of the present disclosure, a distance from the second incident surface to the second side is a second length. The light emitted by each of the second light emitting modules forms a second light radiation region between the second accommodating portion and the second side. The second light radiation region forms a second illumination width at the second side. A ratio of the second illumination width to the second length is greater than 2.

According to an embodiment of the present disclosure, the ratio of the second illumination width to the second length is between 2 and 5.

According to an embodiment of the present disclosure, the second light blending regions are regions in which at least two of the second light radiation regions formed by the second light emitting modules overlap.

According to an embodiment of the present disclosure, a region in which four of the second light radiation regions overlap one another is a four-order second light blending region. The second light blending regions include a plurality of four-order second light blending regions.

As described above, according to an illuminated keyboard and a backlight module thereof of the present disclosure, the backlight module includes a light guide plate, a plurality of first light emitting modules, and a plurality of second light emitting modules. The light guide plate includes a first side and a second side opposite to each other, a plurality of first accommodating portions and a plurality of second accommodating portions. The first light emitting modules are respectively disposed at the first accommodating portions of the light guide plate, and the first incident surfaces face the first side. The second light emitting modules are respectively disposed at the second accommodating portions, and the second incident surfaces face the second side. Moreover, the wavelengths of the light emitted by the first light emitting modules are different at an initial time, and the first light emitting modules change the wavelengths of the light at a predetermined interval, such that a flickering change effect similar to that of a marquee can be produced between the first accommodating portions and the first side of the light guide plate. Similarly, the wavelengths of the light emitted by the second light emitting modules are different at the initial time, and the second light emitting modules change the wavelengths of the light at the predetermined interval, such that a flickering change effect similar to that of a marquee can also be produced between the second accommodating portions and the second side of the light guide plate. In addition, the light guide plate in overall is also capable of producing a cyclic color changing effect. With the structure above, even when the numbers of the first light emitting modules and the second light emitting modules are far less than the number of key structures, the illuminated keyboard and the backlight module can be provided with diversified color changes. In comparison with the conventional illuminated keyboard and backlight module, the number of (the first and second) light emitting modules can be significantly reduced, further lowering production costs.

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 1:
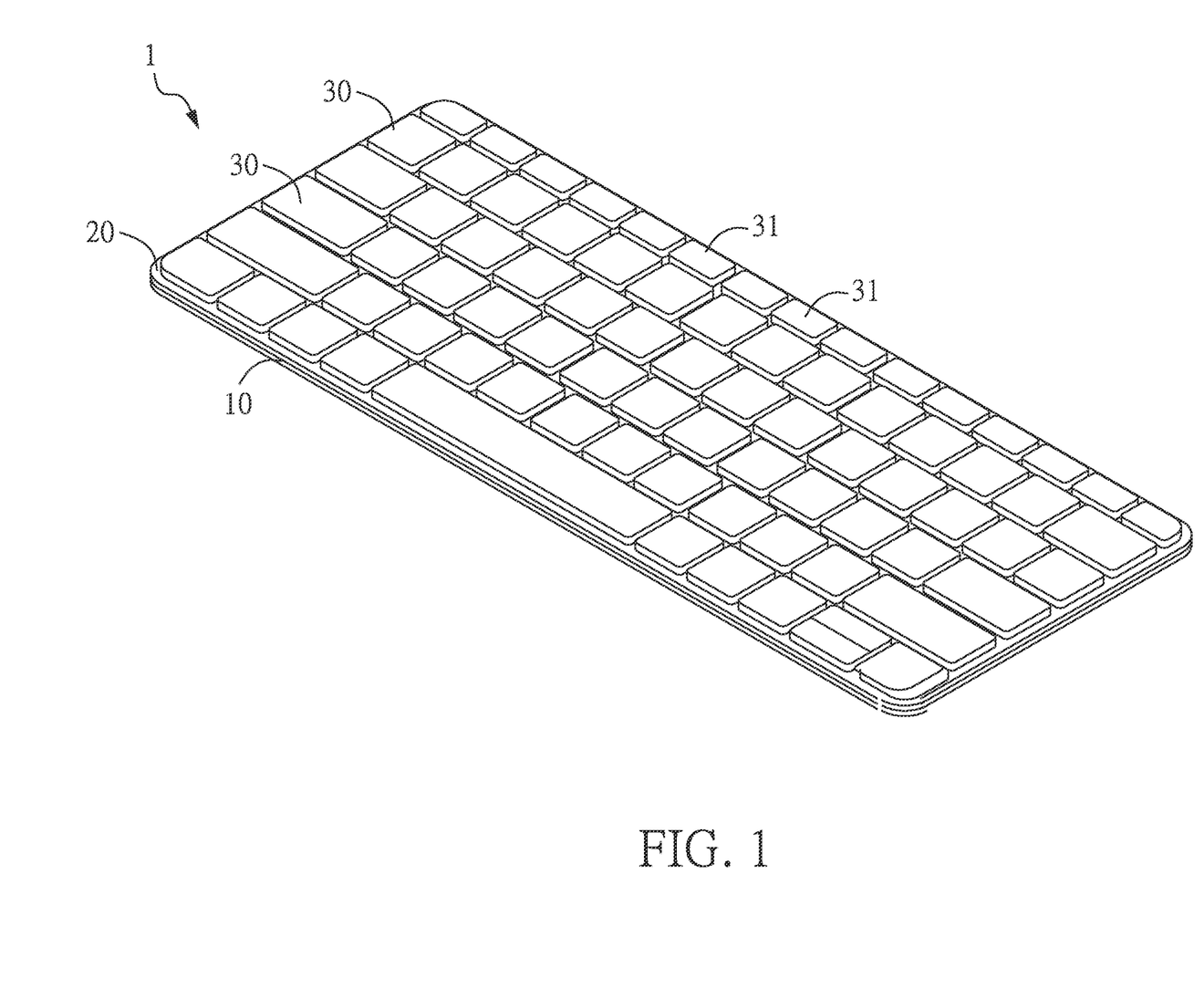
FIG. 1 is a schematic diagram of an illuminated keyboard according to an embodiment of the present disclosure.
Figure 2:
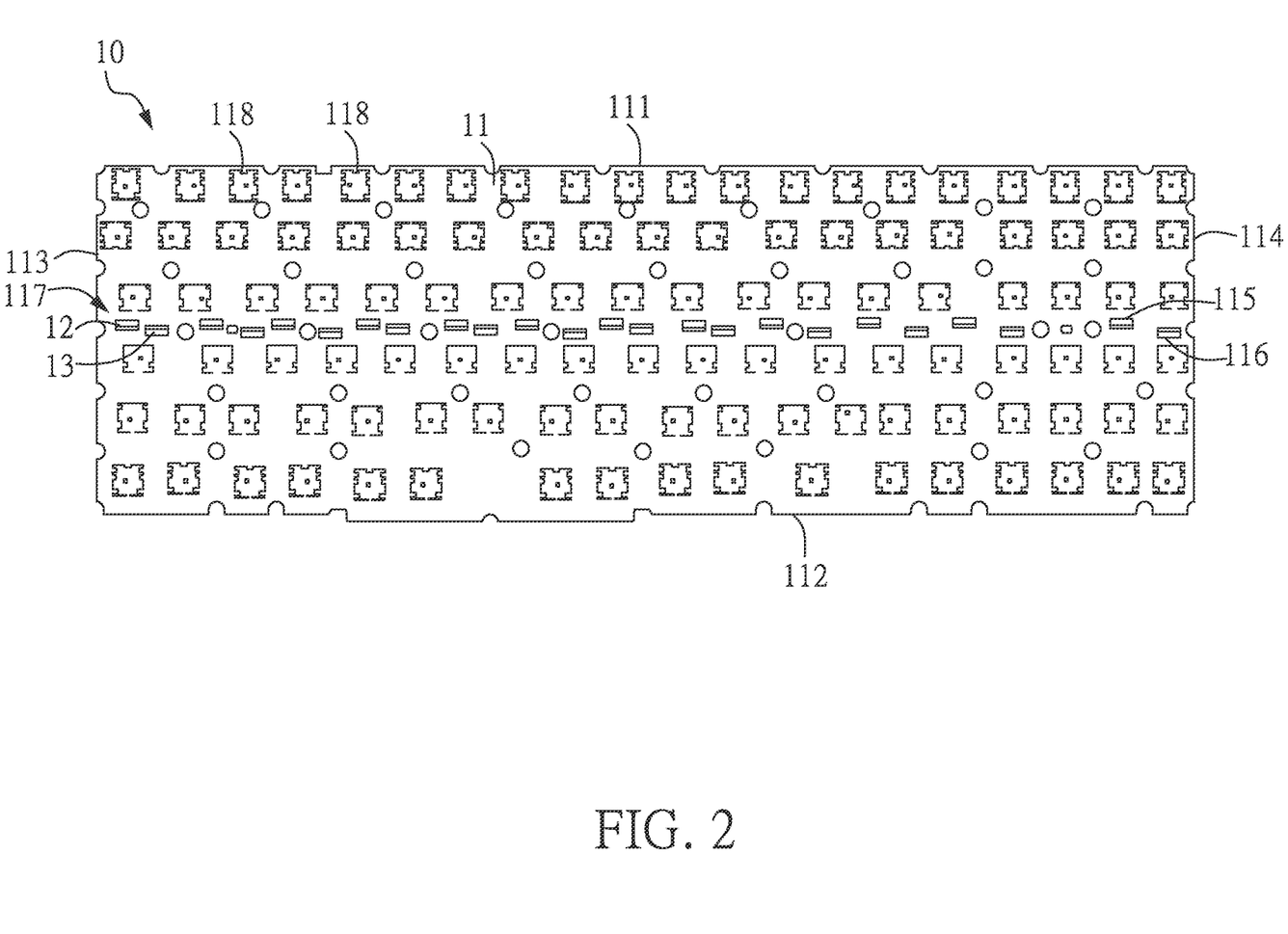
FIG. 2 is a schematic diagram of the backlight module in FIG. 1.
Figure 3:
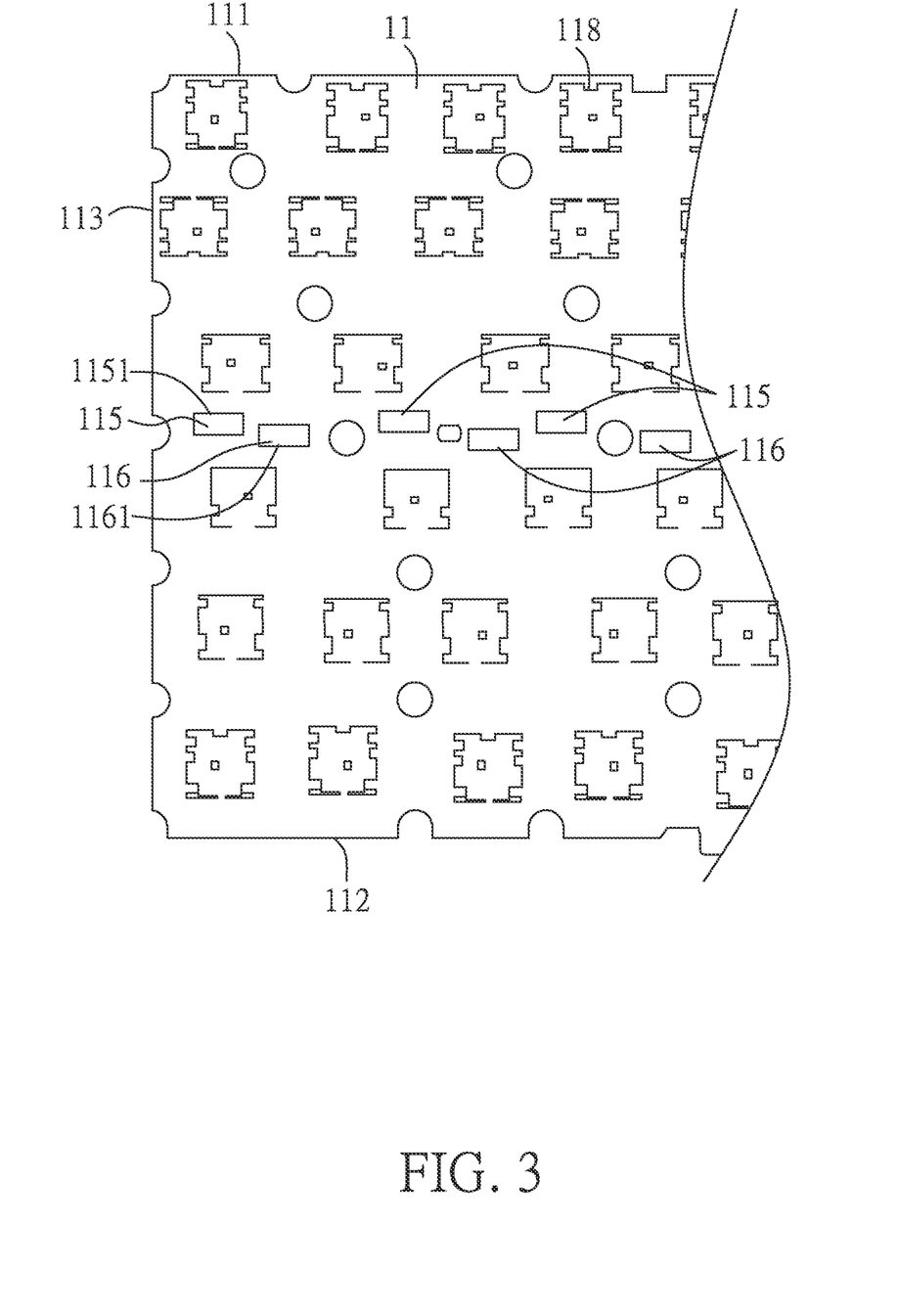
FIG. 3 is a partial enlarged schematic diagram of the light guide plate in FIG. 2.

FIG. 1 shows a schematic diagram of an illuminated keyboard according to an embodiment of the present disclosure. FIG. 2 shows a schematic diagram of the backlight module in FIG. 1. FIG. 3 shows a partial enlarged schematic diagram of the light guide plate in FIG. 2. Refer to FIG. 1, FIG. 2 and FIG. 3. In this embodiment, an illuminated keyboard 1 includes a backlight module 10, a base plate 20 and a plurality of key structures 30. The key structures 30 are connected to the base plate 20. Each of the key structures 30 has a key cap 31 and a connection assembly (not shown). With the connection assembly connecting the base plate 20 and the key cap 31, the key cap 31 can ascend and descend relative to the base plate 20, wherein the connection assembly can be implemented by a scissor link assembly in one embodiment; however, the present disclosure is not limited to the example above. In an actual application, the connection assembly can also be replaced by other structures with a similar function, for example, a V-shaped or A-shaped structure or two parallel link structures. The backlight module 10 is disposed on the base plate 20 and located below the key structures 30. In other words, the backlight module 10 is disposed on a side of the base plate 20 opposite to the key structures 30.

In this embodiment, the backlight module 10 includes a light guide plate 11, a plurality of first light emitting modules 12, and a plurality of second light emitting modules 13. The light guide plate 11 includes a first side 111 and a second side 112 opposite to each other, and a third side 113 and a fourth side 114 opposite to each other. More specifically, the light guide plate 11 is, for example, a rectangular plate. In this embodiment, two opposite long sides of the light guide plate 11 are respectively referred to as the first side 111 and the second side 112, and two opposite short sides of the light guide plate 11 are respectively referred to as the third side 113 and the fourth side 114. In other embodiments, the first side 111 and the second side 112 can also be two opposite short sides of the light guide plate 11, and the third side 113 and the fourth side 114 can be two opposite long sides of the light guide plate 11; the present disclosure is not limited to the examples above.

The light guide plate 11 further includes a plurality of first accommodating portions 115 and a plurality of second accommodating portions 116. The first accommodating portions 115 and the second accommodating portions 116 are disposed between the first side 111 and the second side 112, and are arranged parallel to the first side 111 (or the second side 112). Preferably, the light guide plate 11 has a central region 117. The central region 117 is parallel to the first side 111 and the second side 112. That is, in this embodiment, a middle part between the first side 111 and the second side 112 is referred to as the central region 117. The first accommodating portions 115 and the second accommodating portions 116 are disposed in the central region 117.

Furthermore, the second accommodating portions 116 are arranged alternately with the first accommodating portions 115. That is, the first accommodating portions 115 and the second accommodating portions 116 are arranged alternately. As shown in FIG. 3, the first accommodating portions 115 and the second accommodating portions 116 are sequentially arranged in repetition from the third side 113. In addition, the first accommodating portions 115 and the second accommodating portions 116 can be, for example, through holes or recesses, and respectively accommodate the first light emitting modules 12 and the second light emitting modules 13. Specifically, the first light emitting modules 12 are respectively disposed at the first accommodating portions 115, and the second light emitting modules 13 are respectively disposed at the second accommodating portions 116. Since the second accommodating portions 116 are arranged alternately with the first accommodating portions 115, the first light emitting modules 12 and the second light emitting modules 13 are also arranged alternately in the central region 117. In this embodiment, the first light emitting modules 12 and the second light emitting modules 13 are sequentially arranged in repetition from the third side 113 to the fourth side 114, and are parallel to the first side 111 and the second side 112.

Figure 4:
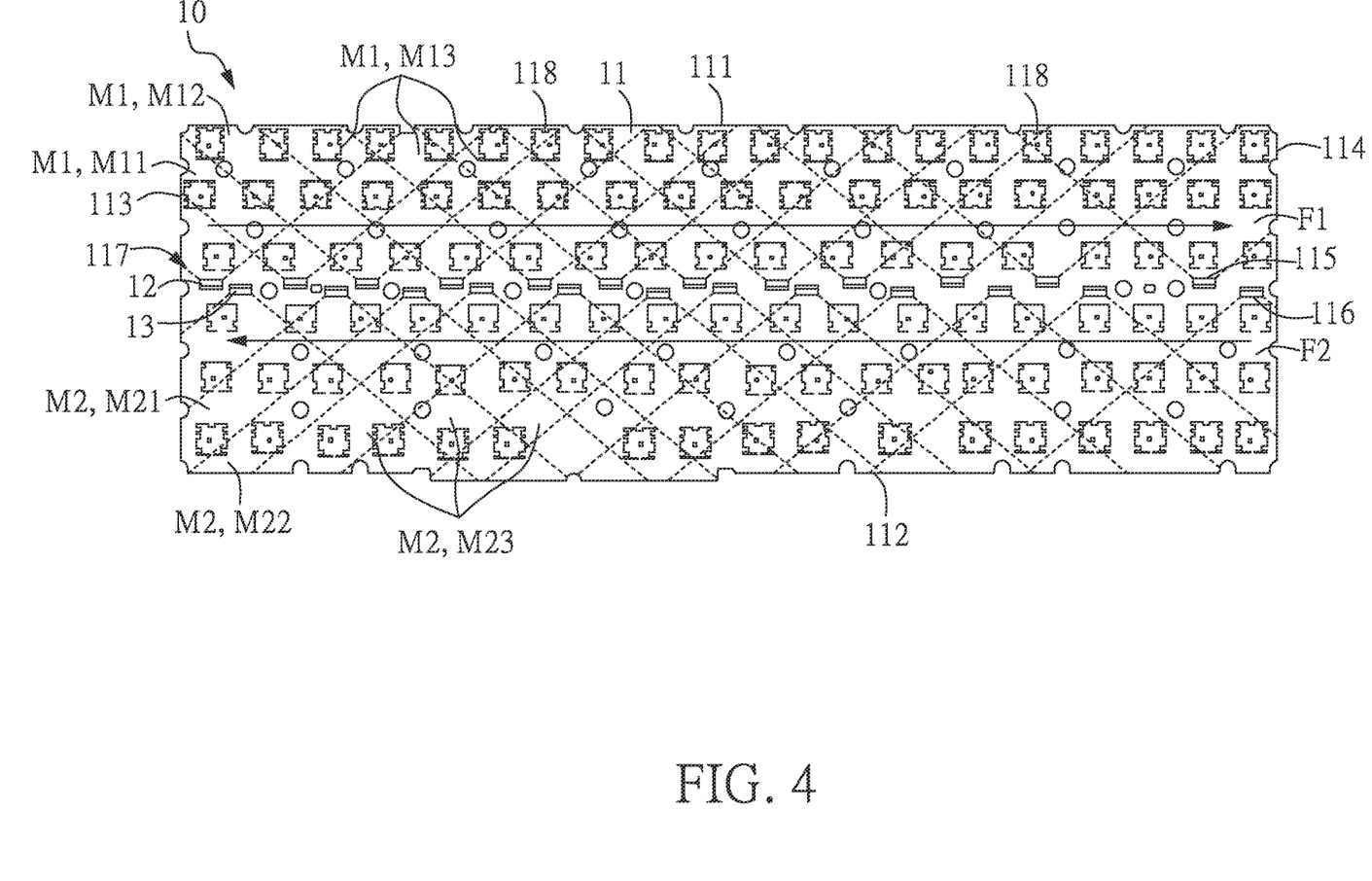
FIG. 4 is a schematic diagram of light of the first light emitting modules and the second light emitting modules transmitted to the light guide plate in FIG. 2.
Figure 5:
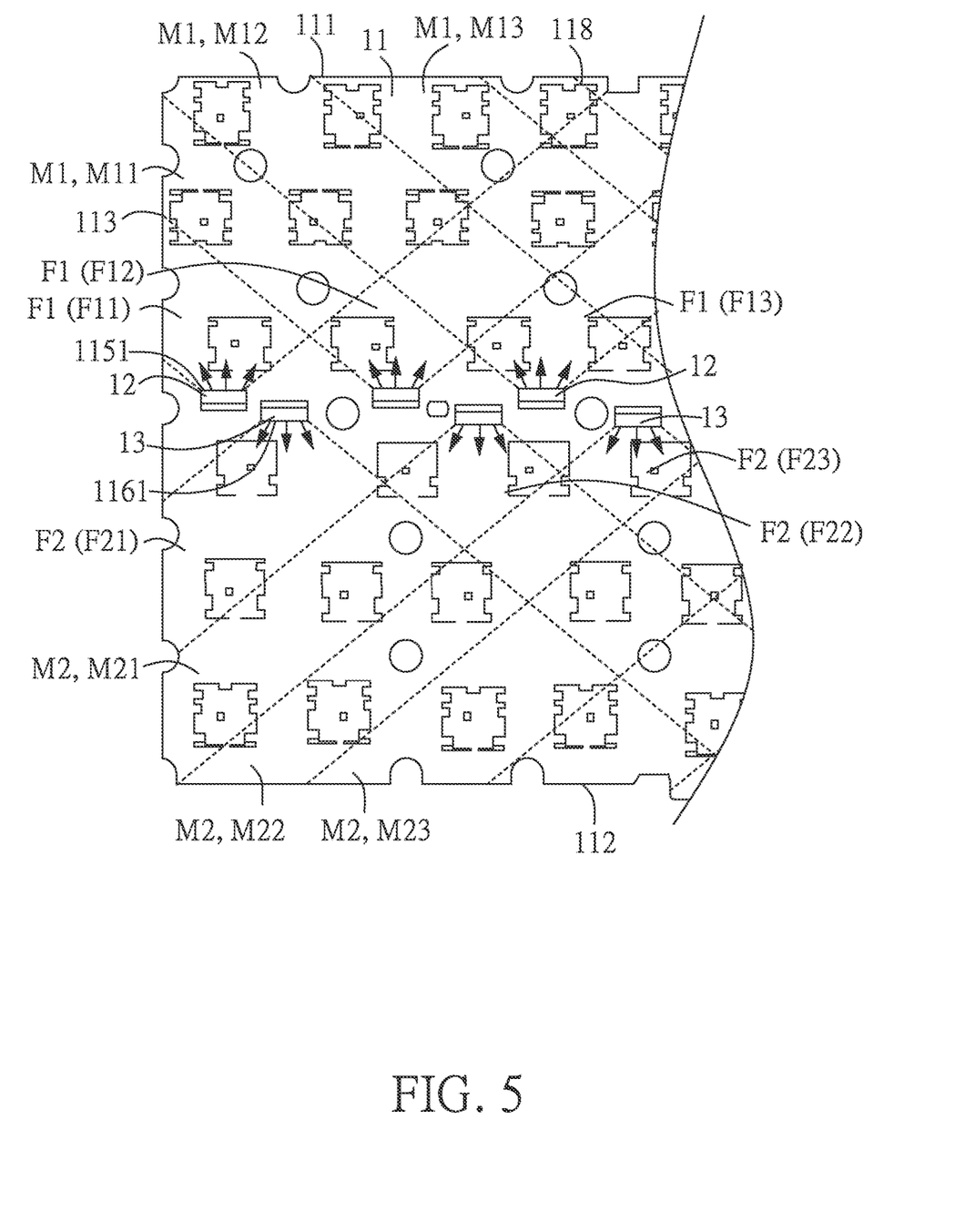
FIG. 5 is a partial enlarged schematic diagram of the backlight module in FIG. 4.

As shown in FIG. 3, each of the first accommodating portions 115 has an incident surface 1151, which faces the first side 111. Each of the second accommodating portions 116 has a second incident surface 1161, which faces the second side 112. The first incident surfaces 1151 and the second incident surfaces 1161 are surfaces via which light enters the light guide plate 11. FIG. 4 shows a schematic diagram of light of the first light emitting modules and the second light emitting modules transmitted to the light guide plate in FIG. 2. FIG. 5 shows a partial enlarged schematic diagram of the backlight module in FIG. 4. Referring to FIG. 3, FIG. 4 and FIG. 5, when the first light emitting modules 12 are mounted to the first accommodating portions 115, light emitting directions of the first light emitting modules 12 can be directed toward the first incident surfaces 1151 (as shown in FIG. 5). The light emitted by the first light emitting modules 12 can enter the light guide plate 11 via the first incident surfaces 1151 and be transmitted toward the first side 111, and form first light radiation regions F1 between the first accommodating portions 115 and the first side 111, as indicated by the dotted lines in FIG. 4 and FIG. 5. Taking the first light emitting module 12 closest to the third side 113 for example, the light emitted therefrom can form a first light radiation region F11 between the first accommodating portion 115 and the first side 111, as indicated by the dotted lines in FIG. 5. Similarly, the light emitted by the second and third ones of the first light emitting modules 12 counted from the third side 113 forms first light radiation regions F12 and F13 between the first accommodating portions 115 and the first side 111, as shown in FIG. 5.

Correspondingly, when the second light emitting modules 13 are mounted to the second accommodating portions 116, light emitting directions of the second light emitting modules 13 can be directed toward the second incident surfaces 1161 (as shown in FIG. 5). The light emitted by the second light emitting modules 13 can enter the light guide plate 11 via the second incident surfaces 1161 and be transmitted toward the second side 112, and form second light radiation regions F2 between the second accommodating portions 116 and the second side 112, as indicated by the dotted lines in FIG. 4 and FIG. 5. Taking the first, second and third ones of the second light emitting modules 13 closest to the third side 113 for example, the light emitted therefrom can form second light radiation regions F21, F22 and F23 between the second accommodating portions 116 and the second side 112, as shown in FIG. 5 in which the symbol of the second light radiation regions F21 are indicated.

Preferably, the light guide plate 11 further includes a plurality of reflecting structures 118 each corresponding to one key cap 31. Alternatively, multiple reflecting structures 118 can also correspond to one key structure 30. Once the light emitted from the first light emitting modules 12 and the second light emitting modules 13 enters the light guide plate 11 and is transmitted to the reflecting structures 118, part of the light can be emitted in a direction of the key caps 31, providing illumination at translucent parts of the key caps 31 or around the key structures 30 to achieve an illumination effect of the illuminated keyboard 1. The reflecting structures 118 can be formed by ink printing, or can be implemented by micro lenses generated by laminating the light guide plate 11; the present disclosure is not limited to the examples above.

Moreover, the first light emitting modules 12 and the second light emitting modules 13 of this embodiment are light sources with variable illumination colors. Specifically, each of the first light emitting modules 12 and the second light emitting modules 13 can include a plurality of light emitting units in different colors, for example, light emitting diodes capable of emitting red light, green light and blue light. In addition, with program control of a circuit or a chip, the first light emitting modules 12 and the second light emitting modules 13 can emit light in different colors at different timings. That is, each of the first light emitting modules 12 and each of the second light emitting modules 13 can emit light in different wavelengths at different timings, wherein the wavelengths are within a predetermined wavelength range between 380 nm and 750 nm (that is, a predetermined wavelength range of visible light), so as to generate light in different colors.

Similarly, with program control of a circuit or a chip, the wavelengths of the light emitted by the first light emitting modules 12 are caused to be different at an initial time. That is, the colors of light emitted by the first light emitting modules 12 are different upon turning on of light sources of the backlight module 10. Preferably, the wavelengths of the light emitted by the first light emitting modules 12 at the initial time decrease gradually from the third side 113 toward the fourth side 114. That is, at the initial time, the wavelength of the light emitted gets longer as the first light emitting modules 12 get closer to the third side 113, and the wavelength of the light emitted gets shorter as the first light emitting modules 12 get closer to the fourth side 114. For example, at the initial time, the wavelength of the light emitted by the first light emitting module 12 closest to the third side 113 is 700 nm (appearing as red), and the wavelength of the light emitted by the first light emitting module 12 closest to the fourth side 114 is 400 nm (appearing as violet). The first light radiation regions F1 between the central region 117 and the first side 111 of the light guide plate 11 display a gradual color change from red to violet from the third side 113 toward the fourth side 114 at the initial time, as indicated by a direction of the arrow in FIG. 4.

As described above, the first light emitting modules 12 are light sources with variable illumination colors, and so the first light emitting modules 12 can change the wavelengths of light at a predetermined interval (for example, one second) with the program control of a circuit or a chip, further changing the colors of the light sources. Preferably, the first light emitting modules 12 can change the wavelengths of the light emitted according to a predetermined color cycle, further enabling the first light emitting modules 12 to cyclically emit light in different colors. For example, the predetermined color cycle can be red, orange, yellow, green, blue and violet. Thus, the first light emitting module 12 closest to the third side 113 emits red light at the initial time, and sequentially changes to emit orange light, yellow light, green light, blue light and violet light at an interval of one second, so as to complete one color cycle. The first light emitting module 12 closest to the fourth side 114 emits violet light at the initial time, and sequentially changes to emit red light, orange light, yellow light, green light and blue light at an interval of one second, so as to complete one color cycle.

Because the first light emitting modules 12 change the wavelengths of light at the predetermined interval, the wavelengths of the light emitted by the adjacent first light emitting modules 12 at a same time are also different. It is learned from the description above, the wavelengths of the light emitted by the first light emitting modules 12 are different at the initial time, and the wavelengths of the light are changed at the predetermined interval, such that a flickering change effect similar to that of a marquee can be produced between the first accommodating portions 115 and the first side 111 of the light guide plate 11.

Similarly, with program control of a circuit or a chip, the wavelengths of the light emitted by the second light emitting modules 13 are caused to be different at the initial time. Preferably, the wavelengths of the light emitted by the second light emitting modules 13 at the initial time decrease gradually from the fourth side 114 toward the third side 113. That is, at the initial time, the wavelength of the light emitted gets shorter as the second light emitting modules 13 get closer to the third side 113, and the wavelength of the light emitted gets longer as the second light emitting modules 13 get closer to the fourth side 114. The configuration above is opposite to that of the first light emitting modules 12. For example, at the initial time, the wavelength of the light emitted by the second light emitting module 13 closest to the third side 113 is 400 nm (appearing as violet), and the wavelength of the light emitted by the second light emitting module 13 closest to the fourth side 114 is 700 nm (appearing as red). The second light radiation regions F2 between the central region 117 and the second side 112 of the light guide plate 11 display a gradual color change from red to violet from the fourth side 114 toward the third side 113 at the initial time, as indicated by a direction of the arrow in FIG. 4.

Moreover, the second light emitting modules 13 similarly change the wavelengths of the light at the predetermined interval (for example, one second). Thus, the wavelengths of the light emitted by adjacent second light emitting modules 13 are also different. Preferably, the second light emitting modules 13 can change the wavelengths of the light emitted according to the predetermined color cycle above, further enabling the second light emitting modules 13 to cyclically emit light in different colors. In continuation from the example above, the second light emitting module 13 closest to the third side 113 emits violet light at the initial time, and sequentially changes to emit red light, orange light, yellow light, green light and blue light at an interval of one second, so as to complete one color cycle. The second light emitting module 13 closest to the fourth side 114 emits red light at the initial time, and sequentially changes to emit orange light, yellow light, green light, blue light and violet light at an interval of one second, so as to complete one color cycle.

Thus, the second light emitting modules 13 can also produce a flickering change effect similar to that of a marquee between the second accommodating portions 116 and the second side 112 of the light guide plate 11. In addition, because the configuration of the second light emitting modules 13 is opposite to that of the first light emitting modules 12, for example, respectively facing the first side 111 and the second side 112, and have opposite arrangements in the colors displayed, the light guide plate 11 is enabled to further in overall produce an effect of cyclic color changes. Preferably, according to the size of a commercially available illuminated keyboard 1, the number of the first light emitting modules 12 can be greater than or equal to 12, and the number of the second light emitting modules 13 can also be greater than or equal to 12. Preferably, the numbers of the first light emitting modules 12 and the second light emitting modules 13 can also each be less than 50. In this embodiment, the numbers of the first light emitting modules 12 and the second light emitting modules 13 are each 24.

In other embodiments, the wavelengths of the light emitted by the first light emitting modules 12 at the initial time can gradually increase from the third side 113 toward the fourth side 114, and the wavelengths of the light emitted by the second light emitting modules 13 at the initial time can gradually decrease from the fourth side 114 toward the third side 113, also enabling the light guide plate 11 to in overall achieve an effect of cyclic color changes.

Figure 6:
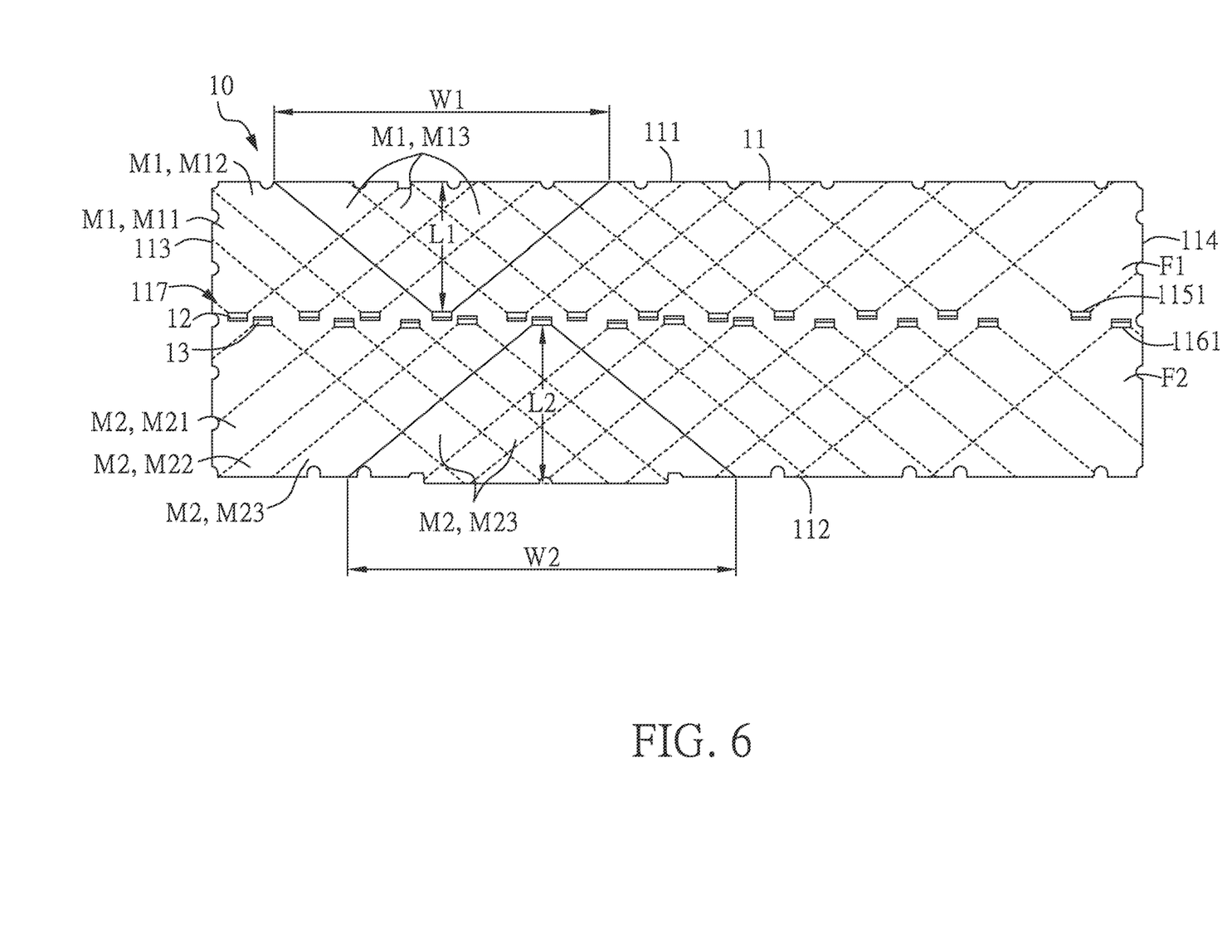
FIG. 6 is a schematic diagram of the light guide plate, the first light emitting modules, and the second light emitting modules in FIG. 4.

FIG. 6 shows a schematic diagram of the light guide plate, the first light emitting modules, and the second light emitting modules in FIG. 4. For better clarity of the drawing, structures such as the reflecting structures 118 and the through holes in FIG. 4 are omitted. Refer to FIG. 4, FIG. 5 and FIG. 6. The light emitted by the first light emitting modules 12 enters the light guide plate 11 via the first incident surfaces 1151, and forms a plurality of first light blending regions M1 between the first accommodating portions 115 and the first side 111. The first light blending regions M1 are regions in which at least two of the first light radiation regions F1 formed by the first light emitting modules 12 overlap. For example, a region in which two first light radiation regions F1 (i.e., F11 and F12) formed at the light guide plate 11 by two first light emitting modules 12 closest to the third side 113 overlap is referred to as a two-order first light blending region M11. A region in which three first light radiation regions F1 (i.e., F11, F12 and F13) formed at the light guide plate 11 by three first light emitting modules 12 closest to the third side 113 overlap is referred to as a three-order first light blending region M12. A region in which four first light radiation regions F1 formed at the light guide plate 11 by four first light emitting modules 12 closest to the third side 113 overlap is referred to as a four-order first light blending region M13.

Similarly, the light emitted by the second light emitting modules 13 enters the light guide plate 11 via the second incident surfaces 1161, and forms a plurality of second light blending regions M2 between the second accommodating portions 116 and the second side 112. Specifically, the second light blending regions M2 are regions in which at least two of the second light radiation regions F2 formed by the second light emitting modules 13 overlap. In this embodiment, a region in which two second light radiation regions F2 (i.e., F21 and F22) formed at the light guide plate 11 by two second light emitting modules 13 closest to the third side 113 overlap is referred to as a two-order second light blending region M21. A region in which three second light radiation regions F2 (i.e., F21, F22 and F23) formed at the light guide plate 11 by three second light emitting modules 13 closest to the third side 113 overlap is referred to as a three-order second light blending region M22. A region in which four second light radiation regions F2 formed at the light guide plate 11 by four second light emitting modules 13 closest to the third side 113 overlap is referred to as a four-order second light blending region M23.

In this embodiment, with the regions in which at least two, three and four first light radiation regions F1 overlap one another formed at the light guide plate 11 by the first light emitting modules 12, that is, the two-order first light blending region M11, the three-order first light blending region M12 and the four-order first light blending region M13, more enriched color distribution is achieved. The region adjacent to the first side 111 further includes a plurality of four-order first light blending regions M13, so as to ensure that continuous and enriched color level changes can be provided at the first side 111 distanced farther away from the first light emitting modules 12. The second light emitting modules 13 have a same configuration as the first light emitting modules 12, and so repeated details are omitted herein.

Preferably, a difference between the wavelengths of the light emitted by two adjacent first light emitting modules 12 at a same time is within a predetermined wavelength range. The predetermined wavelength range can be between 5 nm and 35 nm, and is a wavelength range in which light in two different colors can be blended with each other. In general, a spectrum of visible light is divided into two ranges. One of the ranges is a first range of 185 nm from a start of violet light (380 nm) to an end of green light (565 nm), and the other range is a second range of 175 nm from a start of yellow light (565 nm) to an end of red light (740 nm). Preferably, there are 24 first light emitting modules 12 in this embodiment, and so 12 orders can be distinguished in each of the two ranges above, wherein an average step difference of each order of the first range (185 nm) is about 15 nm, and an average step difference of each order of the second range (175 nm) is about 14 nm, and both are within the predetermined wavelength range. The design above is conducive to forming of the first light blending regions M1 and the second light blending regions M2 at the light guide plate 11 by the first light emitting modules 12 and the second light emitting modules 13.

Preferably, the number of the first light blending regions M1 is greater than or equal to 3, and the number of the second light blending regions M2 is greater than or equal to 3. With the first light blending regions M1 and the second light blending regions M2 formed at the light guide plate 11, the illuminated keyboard 1 and the backlight module 10 are enabled to display more diversified color changes, and the illuminated keyboard 1 in full colors can be implemented.

Furthermore, with a breadth of the first light radiation regions F1 formed by the first light emitting modules 12, the first light blending regions M1 can include a plurality of four-order first light blending regions M13. In FIG. 4 and FIG. 6, three of the four-order first light blending regions M13 are provided as an example. Specifically, a distance from the first incident surfaces 1151 to the first side 111 of this embodiment is a first length L1, as shown in FIG. 6. Moreover, a first illumination width W1 is formed at the first side 111 when the light emitted by the first light emitting modules 12 is transmitted to the first side 111 in the light guide plate 11. That is, the first light radiation regions F1 form the first illumination width W1 at the first side 111. In this embodiment, a ratio of the first illumination width W1 to the first length L1 is greater than 2. In other words, the first illumination width W1 is greater than twice the first length L1. Preferably, the ratio of the first illumination width W1 to the first length L1 is between 2 and 5, and more preferably, between 2.8 and 4.3. For example, a light emitting angle of the first light emitting modules 12 can be between 110 degrees and 130 degrees. When the light emitting angle is 110 degrees, the first illumination width W1 is about 2.86 times the first length L1. When the light emitting angle is 130 degrees, the first illumination width W1 is about 4.29 times the first length L1. With the restriction above, the four first light radiation regions F1 can overlap one another to form the four-order first light blending region M13, and a plurality of four-order first light blending regions M13 can be achieved to display color stacking and changes of more layers.

Similarly, a distance from the second incident surfaces 1161 to the second side 112 of this embodiment is a second length L2, as shown in FIG. 6. Moreover, the second light radiation regions F2 can form a second illumination width W2 at the second side 112. In this embodiment, a ratio of the second illumination width W2 to the second length L2 is greater than 2, preferably between 2 and 5, and more preferably, between 2.8 and 4.3. For example, a light emitting angle of the second light emitting modules 13 can be between 110 degrees and 130 degrees. When the light emitting angle is 110 degrees, the second illumination width W2 is about 2.86 times the second length L2. When the light emitting angle is 130 degrees, the second illumination width W2 is about 4.29 times the second length L2. With the restriction above, the four second light radiation regions F2 can overlap one another to form the four-order second light blending region M23, and a plurality of four-order second light blending regions M23 can be achieved to display color stacking and changes of more layers.

In conclusion, according to an illuminated keyboard and a backlight module thereof of the present disclosure, the backlight module includes a light guide plate, a plurality of first light emitting modules, and a plurality of second light emitting modules. The light guide plate includes a first side and a second side opposite to each other, a plurality of first accommodating portions and a plurality of second accommodating portions. The first light emitting modules are respectively disposed at the first accommodating portions of the light guide plate, and the first incident surfaces face the first side. The second light emitting modules are respectively disposed at the second accommodating portions, and the second incident surfaces face the second side. Moreover, the wavelengths of the light emitted by the first light emitting modules are different at an initial time, and the first light emitting modules change the wavelengths of the light at a predetermined interval, such that a flickering change effect similar to that of a marquee can be produced between the first accommodating portions and the first side of the light guide plate. Similarly, the wavelengths of the light emitted by the second light emitting modules are different at the initial time, and the second light emitting modules change the wavelengths of the light at the predetermined interval, such that a flickering change effect similar to that of a marquee can also be produced between the second accommodating portions and the second side of the light guide plate. In addition, the light guide plate in overall is also capable of producing a cyclic color changing effect. With the structure above, even when the numbers of the first light emitting modules and the second light emitting modules are far less than the number of key structures, the illuminated keyboard and the backlight module can be provided with diversified color changes. In comparison with the conventional illuminated keyboard and backlight module, the number of (the first and second) light emitting modules can be significantly reduced, further lowering production costs.

In addition, the light emitted by each of the first light emitting modules forms a plurality of first light blending regions between the first accommodating portions and the first side, and the light emitted by each of the second light emitting modules forms a plurality of second light blending regions between the second accommodating portions and the second side. With the plurality of (first and second) blending regions, the illuminated keyboard and the backlight module are enabled to display more diversified color changes, and an illuminated keyboard in full colors can be implemented.

Moreover, the first light blending regions are regions in which at least two of the first light radiation regions formed by the first light emitting modules overlap, and the second light blending regions are regions in which at least two of the second light radiation regions formed by the second light emitting modules overlap. Thus, the illuminated keyboard and the backlight module thereof are enabled to display more diversified color changes, and an illuminated keyboard in full colors can be implemented. In addition, since the first light blending regions include a plurality of four-order first light blending regions and the second light blending regions include a plurality of four-order second light blending regions, color stacking and changes of more layers can also be displayed.

Although the present disclosure has been explained in relation to its preferred embodiments, it is to be understood that many other possible modifications and variations can be made without departing from the spirit and scope of the disclosure as hereinafter claimed.

What is claimed is:

1. A backlight module, comprising: a light guide plate, comprising: a first side and a second side opposite to each other, wherein the first side and the second side are two opposite long sides of the light guide plate; a plurality of first accommodating portions, disposed between the first side and the second side, each of the first accommodating portions comprising a first incident surface facing the first side; and a plurality of second accommodating portions, disposed alternately with the first accommodating portions, each of the second accommodating portions comprising a second incident surface facing the second side; a plurality of first light emitting modules, respectively disposed at the first accommodating portions, wherein wavelengths of light emitted by the first light emitting modules are different at an initial time, the wavelengths of the light are changed at a predetermined interval, and the light emitted by the first light emitting modules enters the light guide plate via the first incident surfaces and forms a plurality of first light blending regions between the first accommodating portions and the first side; and a plurality of second light emitting modules, respectively disposed at the second accommodating portions, wherein wavelengths of light emitted by the second light emitting modules are different at the initial time, the wavelengths of the light are changed at the predetermined interval, and the light emitted by the second light emitting modules enters the light guide plate via the second incident surfaces and forms a plurality of second light blending regions between the second accommodating portions and the second side, wherein the wavelengths of the light emitted by the adjacent first light emitting modules and the adjacent second light emitting modules at a same time are different and wherein a number of the first light blending regions is greater than or equal to 3, and a number of the second light blending regions is greater than or equal to 3.

2. The backlight module according to claim 1, wherein the light guide plate further comprises a third side and a fourth side opposite to each other, and the first light emitting modules and the second light emitting modules are arranged from the third side to the fourth side, and are parallel to the first side and the second side.

3. The backlight module according to claim 1,
wherein the light guide plate has a central region, and the first accommodating portions and the second accommodating portions are disposed in the central region, a number of the first light emitting modules is greater than or equal to 12, and a number of the second light emitting modules is greater than or equal to 12.

4. The backlight module according to claim 1, wherein a distance from the second incident surface to the second side is a second length, the light emitted by each of the second light emitting modules enters the light guide plate via the second incident surfaces and be transmitted toward the second side to form a second light radiation region between the second accommodating portion and the second side, and to from a second illumination width at the second side, and a ratio of the second illumination width to the second length is greater than 2.

5. The backlight module according to claim 1, wherein the light guide plate further comprising:
a plurality rows of key accommodation areas, with the plurality of first accommodating portions and the plurality of second accommodating portions being disposed between two rows of key accommodation areas.

6. The backlight module according to claim 2, wherein the wavelengths of the light emitted by the first light emitting modules at the initial time decrease gradually from the third side toward the fourth side.

7. The backlight module according to claim 6, wherein the wavelengths of the light emitted by the second light emitting modules at the initial time decrease gradually from the fourth side toward the third side.

8. A backlight module, comprising:
a light guide plate, comprising:
a first side and a second side opposite to each other, wherein the first side and the second side are two opposite long sides of the light guide plate;
a plurality of first accommodating portions, disposed between the first side and the second side, each of the first accommodating portions comprising a first incident surface facing the first side; and
a plurality of second accommodating portions, disposed alternately with the first accommodating portions, each of the second accommodating portions comprising a second incident surface facing the second side;
a plurality of first light emitting modules, respectively disposed at the first accommodating portions, wherein wavelengths of light emitted by the first light emitting modules are different at an initial time, the wavelengths of the light are changed at a predetermined interval, and the light emitted by the first light emitting modules enters the light guide plate via the first incident surfaces and forms a plurality of first light blending regions between the first accommodating portions and the first side; and
a plurality of second light emitting modules, respectively disposed at the second accommodating portions, wherein wavelengths of light emitted by the second light emitting modules are different at the initial time, the wavelengths of the light are changed at the predetermined interval, and the light emitted by the second light emitting modules enters the light guide plate via the second incident surfaces and forms a plurality of second light blending regions between the second accommodating portions and the second side,
wherein the wavelengths of the light emitted by the adjacent first light emitting modules and the adjacent second light emitting modules at a same time are different,
wherein a difference between the wavelengths of the light emitted by two adjacent of the first light emitting modules is within a predetermined wavelength range, a difference of the wavelengths of the light emitted by two adjacent of the second light emitting modules is within the predetermined wavelength range, and the predetermined wavelength range is between 5 nm and 35 nm.

9. A backlight module, comprising:
a light guide plate, comprising:
a first side and a second side opposite to each other, wherein the first side and the second side are two opposite long sides of the light guide plate;
a plurality of first accommodating portions, disposed between the first side and the second side, each of the first accommodating portions comprising a first incident surface facing the first side; and
a plurality of second accommodating portions, disposed alternately with the first accommodating portions, each of the second accommodating portions comprising a second incident surface facing the second side;
a plurality of first light emitting modules, respectively disposed at the first accommodating portions, wherein wavelengths of light emitted by the first light emitting modules are different at an initial time, the wavelengths of the light are changed at a predetermined interval, and the light emitted by the first light emitting modules enters the light guide plate via the first incident surfaces and forms a plurality of first light blending regions between the first accommodating portions and the first side; and
a plurality of second light emitting modules, respectively disposed at the second accommodating portions, wherein wavelengths of light emitted by the second light emitting modules are different at the initial time, the wavelengths of the light are changed at the predetermined interval, and the light emitted by the second light emitting modules enters the light guide plate via the second incident surfaces and forms a plurality of second light blending regions between the second accommodating portions and the second side,
wherein the wavelengths of the light emitted by the adjacent first light emitting modules and the adjacent second light emitting modules at a same time are different,
wherein a distance from the first incident surface to the first side is a first length, the light emitted by each of the first light emitting modules enters the light guide plate via the first incident surfaces and be transmitted toward the first side to form a first light radiation region between the first accommodating portion and the first side, and to from a first illumination width at the first side, and a ratio of the first illumination width to the first length is greater than 2.

10. The backlight module according to claim 9, wherein the ratio of the first illumination width to the first length is between 2 and 5.

11. The backlight module according to claim 9, wherein the first light blending regions are regions in which at least two of the first light radiation regions formed by the first light emitting modules overlap.

12. A backlight module, comprising:
a light guide plate, comprising:
a first side and a second side opposite to each other, wherein the first side and the second side are two opposite long sides of the light guide plate;
a plurality of first accommodating portions, disposed between the first side and the second side, each of the first accommodating portions comprising a first incident surface facing the first side; and
a plurality of second accommodating portions, disposed alternately with the first accommodating portions, each of the second accommodating portions comprising a second incident surface facing the second side;

a plurality of first light emitting modules, respectively disposed at the first accommodating portions, wherein wavelengths of light emitted by the first light emitting modules are different at an initial time, the wavelengths of the light are changed at a predetermined interval, and the light emitted by the first light emitting modules enters the light guide plate via the first incident surfaces and forms a plurality of first light blending regions between the first accommodating portions and the first side, wherein the light emitted by each of the first light emitting modules enters the light guide plate via the first incident surfaces and be transmitted toward the first side to form a first light radiation region between the first accommodating portion and the first side, a region in which four of the first light radiation regions overlap with one another is a four-order first light blending region, and the first light blending regions comprise a plurality of the four-order first light blending regions; and a plurality of second light emitting modules, respectively disposed at the second accommodating portions, wherein wavelengths of light emitted by the second light emitting modules are different at the initial time, the wavelengths of the light are changed at the predetermined interval, and the light emitted by the second light emitting modules enters the light guide plate via the second incident surfaces and forms a plurality of second light blending regions between the second accommodating portions and the second side, wherein the wavelengths of the light emitted by the adjacent first light emitting modules and the adjacent second light emitting modules at a same time are different.

13. The backlight module according to claim 4, wherein the ratio of the second illumination width to the second length is between 2 and 5.

14. The backlight module according to claim 4, wherein the second light blending regions are regions in which at least two of the second light radiation regions formed by the second light emitting modules overlap.

15. The backlight module according to claim 14, wherein a region in which four of the second light radiation regions overlap with one another is a four-order second light blending region, and the second light blending regions comprise a plurality of the four-order second light blending regions.

* * * * *